Figure 1:
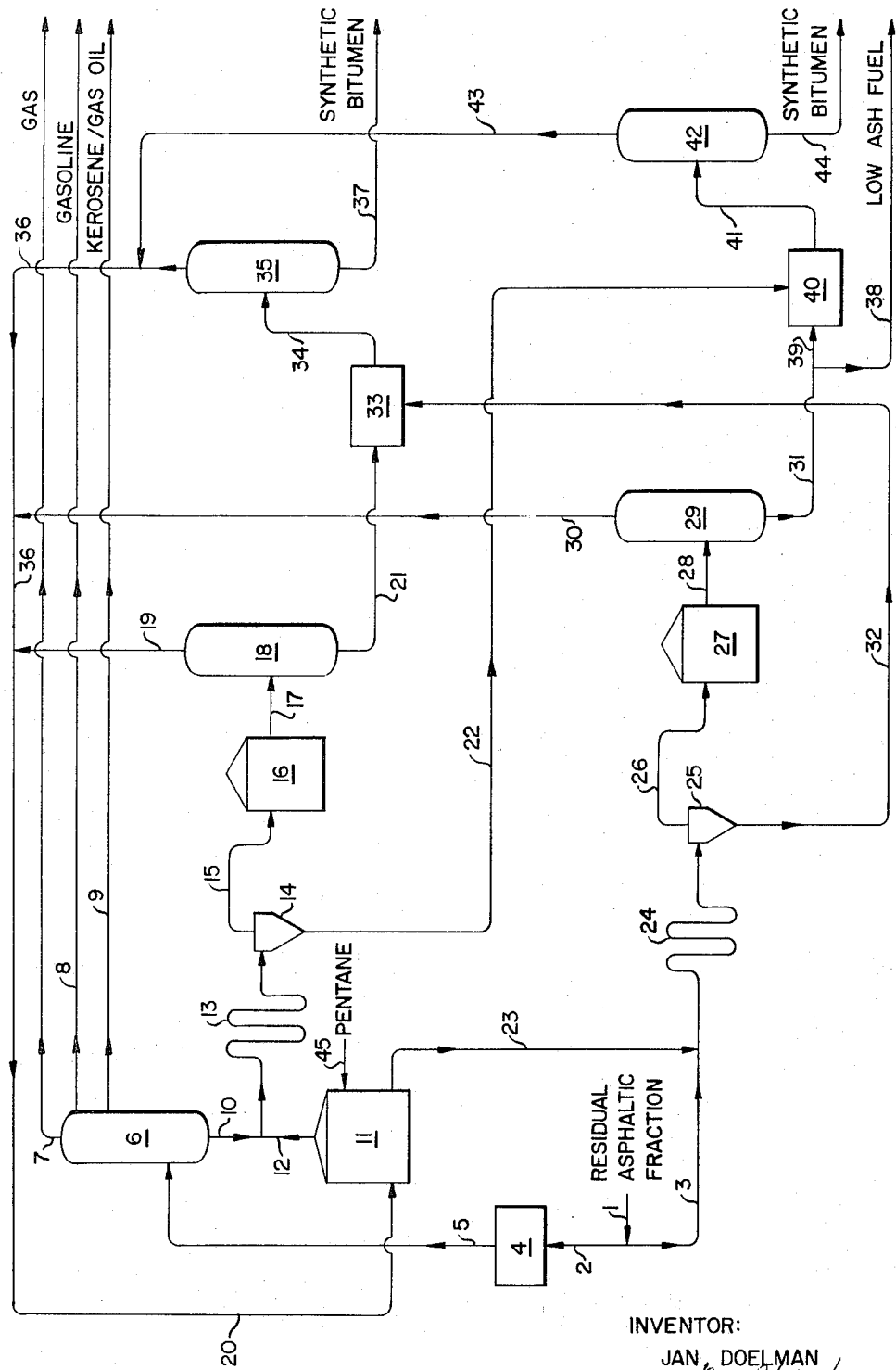

Feb. 7, 1967 J. DOELMAN 3,303,122
INTEGRATED PROCESS FOR THE PREPARATION OF SYNTHETIC BITUMENS
Filed Feb. 3, 1965 2 Sheets-Sheet 1

INVENTOR:
JAN DOELMAN
BY:
HIS ATTORNEY

United States Patent Office 3,303,122
Patented Feb. 7, 1967

3,303,122
INTEGRATED PROCESS FOR THE PREPARATION OF SYNTHETIC BITUMENS
Jan Doelman, Amsterdam, Netherlands, assignor to Shell Oil Company, New York, N.Y., a corporation of Delaware
Filed Feb. 3, 1965, Ser. No. 430,018
Claims priority, application Netherlands, Feb. 24, 1964, 64/01698
8 Claims. (Cl. 208—45)

The invention relates to an integrated process for the preparation of synthetic bitumens.

Asphaltic bitumens are widely used in road construction, for roofing purposes, to coat pipelines, for impregnating purposes, as binders for briquettes, etc.

For these various applications asphaltic bitumens are required which differ widely in type and in properties. Hence, it is not possible, starting from a single asphaltic residue, to prepare all these different types of asphaltic bitumens exclusively by treatments involving distillation; for the properties of straight-run asphaltic bitumens are substantially determined by the nature of the crude serving as a starting material and the bitumens thus obtained will therefore be suitable for only a limited number of applications.

In order to remove this difficulty, it has been tried in various ways to modify the properties of asphaltic bitumens obtained by distillation. By physical processing, this is possible in that, from the asphaltic starting material or from the asphaltic bitumen prepared from it, certain fractions are removed, for instance, by extraction, or in that to the asphaltic bitumen are added certain distillate or residual fractions of different origin. By chemical processing the properties of asphaltic bitumen have been modified, for instance, in that the asphaltic starting material is cracked or is subjected to an oxidative treatment (blowing).

The changes in properties of asphaltic bitumens which may be brought about by the processes indicated hereinbefore are based on a change in composition of the extremely complex, colloidal system of mainly hydrocarbon compounds from which the asphaltic bitumen is comprised.

To characterize the composition and the properties linked up with it, the components of asphaltic products have been divided into three classes, namely, oil, resins and asphaltenes. There is no clear distinction between these classes of compounds and, in fact, there is a gradual transition from oil to resins and from resins to asphaltenes. Although no hard and fast lines between these classes of compounds can be indicated, these distinctions and the terms used to designate them nevertheless constitute for those skilled in the art a simple means to describe asphaltic products.

As already touched upon hereinbefore, the various processes which are used with the aim of modifying the properties of a bituminous product in certain respects are based to a large extent on a change of the ratio of oil, resins and asphaltenes to one another.

As characteristic properties for asphaltic bitumens may be mentioned penetration, softening point, ductility and temperature sensitivity. For practical purposes it is particularly the temperature sensitivity that is an important property. It is mostly expressed as the "penetration index" which is a relationship of penetration and ring and ball softening point, and is defined in accordance with the following relationship:

$$90 \log \frac{800}{P} = \left(\frac{20-P.I.}{10+P.I.}\right)(S-77)$$

wherein
$P$=penetration, dmm. at 77° F. (ASTM D5)
$S$=R. and B. softening point, ° F. (ASTM E28–58T)
$P.I.$=penetration index
(Refer to Pfeiffer et al., National Petroleum News, 40, pp. R78–84 (1938).)

On the basis of this property asphaltic bitumens are divided into three groups, viz. (1) asphaltic bitumens with a penetration index $<-2$, which display purely viscous flow and are usually indicated as pitch-type bitumens, (2) asphaltic bitumens with a penetration index of from $-2$ to $+2$, which show a certain elasticity and in general little thixotropy and which include the "sol-type" bitumens, also called normal-type bitumens, and (3) asphaltic bitumens with a penetration index $>+2$, which, in addition to elasticity, also display thixotropy; they are the "gel-type" or "blown-type" bitumens.

The insight gained into the constitution of asphaltic products has aided in the development of various processes for the preparation of asphaltic bitumens with certain properties as desired.

A process that has gained wide application in the petroleum industry is the blowing process, which may or may not be operated in the presence of a catalyst. With a given asphaltic residue as starting material, this process enables an asphaltic bitumen with a raised penetration index to be prepared. The blowing process, however, is relatively costly; it proceeds at a slow rate and requires, in general, close control of the temperature, the quantity of air used and the way in which the air is distributed in the asphaltic residue.

Asphaltic bitumens with a reduced penetration index can be obtained by cracking asphaltic starting material. This process, however, has hardly come to establish itself in actual practice because the resulting asphaltic bitumens are usually not very stable and are generally unable to pass the Oliensis spot test, which is required in many parts of the United States.

Although, then, within certain limits it is possible to change the penetration index of an asphaltic bitumen, thermal treatments, such as blowing and cracking, are generally disadvantageous in that they disturb the complicated colloidal structure of the asphaltic bitumen, which is, in particular, reflected by the state of peptization of the asphaltenes. Furthermore, with these processes independent variation of the characteristic properties, such as penetration, softening point and ductility, is not very well possible. All this essentially means that in this way only a limited number of bitumen qualities can be prepared. Therefore it is, in many cases, necessary to subject the product obtained to further treatments or to add certain oil fractions or bitumen fractions of different origin to it.

A process removing many of the difficulties indicated has been described in the copending U.S. patent application Ser. No. 332,627, filed Dec. 23, 1963. According to this process a synthetic bitumen is prepared from a residual oil by separating the asphaltenes from part of the residual-oil stream and adding them to the remaining part of the residual oil stream, and subsequently distilling from the mixture thus obtained a certain quantity of oil components; as a valuable by-product, an asphaltene-free oil with a reduced ash content is obtained. Although through variation of the various streams a number of different bitumen grades can be obtained, this process is, of necessity, limited by the nature of the residual oil used as starting material.

The integrated process according to the present invention renders it possible to prepare, starting from a straight-run asphaltic residue and from a cracked asphaltic residue, synthetic bitumens of almost any grade. The process is characterized in that the residues are each separated into an oil fraction at least partly freed from asphaltenes, and an asphaltenes-containing fraction. The oil fraction from the straight-run residue and the asphaltenes-containing fraction from the cracked residue are subsequently mixed, completely or partly, to a synthetic asphaltic bitumen with a raised penetration index. In addition, the oil fraction from the cracked residue and the asphaltenes-containing fraction from the straight-run residue are mixed, completely or partly, to a synthetic bitumen with a reduced penetration index. If desired, each of the asphaltic bitumens thus obtained can be subjected to a distillation to prepare bitumens of greater hardness.

In the following discussion, the oil and the asphaltenes originating from the cracked residue will, for the sake of briefness, be referred to as cracked oil and cracked asphaltenes, respectively.

It is observed that by the term "synthetic bitumens" is meant asphaltic bitumens obtained by mixing certain high-boiling oil fractions, resins and asphaltenes, which may be of either totally or partially different origin. The stands in contrast to the asphaltic biumens which have been prepared by conventional means through distillation, extraction, blowing or cracking. According to the distillation and extraction processes, certain constituents are removed from the asphaltic residue; while according to the blowing and the cracking process, the composition of the starting material is changed through chemical conversion.

As explained in the foregoing, changing the penetration index of a given asphaltic material was already known in the art. A raised penetration index can be obtained by blowing and a reduced penetration index by cracking. Apart from the fact that the preparation of the two types of asphaltic bitumens requires both a cracking and a blowing installation, it is an important drawback that these thermal treatments disturb the colloidal structure of the bitumen. One of the consequences of this is that the stability of the asphaltic bitumen is reduced, which manifests itself, for instance, in a reduced resistance to changing weather conditions. In the blowing process, this disturbance is linked with the fact that in the residue the ratio of oil constituents, resins and asphaltenes to one another undergoes a change. For, in this process the resins are converted into asphaltene-like compounds, while certain oil constituents form resin-like compounds. However, with respect to the "blown" asphaltenes these "new" resins have considerably poorer peptizing properties. A similar decline in the stability occurs in cracking to an even higher degree.

A very surprising element in the process according to the invention is the fact that, while using the cracking process, which in itself is generally not very suitable for the preparation of asphaltic bitumens, synthetic bitumens can be prepared which do not display the drawbacks caused by the disturbance of the colloidal system described hereinbefore. Apparently, both in the composition obtained by mixing of the cracked asphaltenes with the non-cracked oil and in the composition obtained by mixing of the non-cracked aspaltenes with the cracked oil, the presence of the non-cracked constituents assures sufficient stability.

Apart from this, the present process offers several other important advantages. For in principle it is possible to prepare, on the basis of only one asphaltic residue, a large number of synthetic bitumens with divergent properties, notably (1) through the choice of the ratio between the quantities of starting material to be cracked and not to be cracked, (2) through adjustment of the cracking depth, and (3) through variation in the mixing ratio between the cracked and the non-cracked fractions. More extensive possibilities present themselves if the starting material consists of two or more asphaltic residues of different origin or of mixtures thereof. A suitable choice of the residues and of their quantities permits control of the quantities of cracked and non-cracked asphaltenes and the cracked and non-cracked oils in such a way that all bitumen grades can be prepared in the quantities desired without an inconvenient surplus being formed.

One of the most important factors with reference to influencing the properties of the present final products is the cracking depth. Accordingly, as cracking is effected under more stringent conditions, it is possible to prepare bitumens with more widely divergent penetration indices. For example, asphaltenes originating from a deeply cracked residue produce, in combination with non-cracked oil, an asphaltic product with a penetration index of +5 or higher. On the other hand, oil originating from a deeply cracked residue may produce, in combination with non-cracked asphaltenes, an asphaltic product with a penetration index of −1 or lower.

As cracking processes, both thermal and catalytic processes are suitable. If desired, the cracking treatment is effected in the presence of hydrogen, for instance, under conditions at which hydro-cracking occurs. The temperature and the residence time in the reaction zone are so chosen that the desired degree of cracking is realized, the residence time being shorter for higher cracking temperatures and vice versa. The temperatures in the cracking zone are in general between 400 and 540° C. and preferably between 450–500° C. If the residue must be subjected to deep cracking, the combination of a relatively low cracking temperature and a somewhat longer residence time are to be preferred to a higher cracking temperature and a short residence time. Accordingly, as the cracking temperature is higher the chance increases that in the cracking residue larger quantities of benzene-insoluble products are formed, which are as a rule not very desirable in the present synthetic bitumens. In certain cases a light cracking treatment will be sufficient. A vary suitable mild cracking process is that which is known as visbreaking.

As already explained hereinbefore, the resins present in the present residual starting materials play an important role as regards the properties of the synthetic bitumens to be prepared from them. This is particularly the case if synthetic bitumens must be prepared on the basis of a deeply cracked asphaltic residue, for the asphaltenes separated from it are in general difficult to peptize.

It has now been found that this drawback can, in accordance with the invention, be entirely overcome by combining the cracked asphaltenes with an oil fraction originating from straight-run residue which has a high content of original, i.e. non-cracked resins. It is therefore of importance to effect the separation of the asphaltic starting materials into "oil" and "asphaltenes" in such a way that the larger part of the resins is present in the oil phase.

A process eminently suited to the separation of asphaltenes from residual oils has been described in the U.S. Patent 3,159,571, issued December 1, 1964. Briefly, the process comprises precipitating the asphaltenes with a precipitant and separating the precipitated constituents by passing the oil-containing mixture through one or more hydrocyclones and/or multicyclones.

Suitable precipitants for precipitating the asphaltenes in this process are hydrocarbons with from 4 to 9 carbon atoms in the molecule, with or without polar groups as substituents, which hydrocarbons have a surface tension with respect to air of less than 24 dynes per cm. at 25° C. As examples may be mentioned paraffinic hydrocarbons, such as pentane, hexane, heptane and isooctane, and low-molecular-weight materials such as methyl cyclohexane, dimethyl cyclopentane, diethyl ether, ethyl acetate and mixtures of these. From considerations of economy, low-boiling paraffinic hydrocarbons are preferably used. Pentane and pentane-containing hydrocarbon oil fractions as obtained in the form of technical mixtures, for instance, from straight distillation of crude oil, are available in large quantities in almost any refinery.

For the precipitation of the asphaltenes, as a rule, 2–10 parts by volume, and preferably 4.5–8.5 parts by volume, of precipitant to one part by volume of oil is used.

Precipitation may be effected either batchwise or continuously. Preference is given, however, to the continuous process. The residual oil, which has preferably first been mixed with part of the precipitant to lower its viscosity, is fed continuously into a mixing device, in which the oil mixture, after precipitation of the asphaltenes by addition of more precipitant, is present for an average residence time of from 0.3 to 10 minutes and preferably of from 1 to 6 minutes, after which the mixture with agglomerated asphaltene particles is passed through one or more hydrocyclones and/or multicyclones, the oil phase issuing from the overflow opening and the asphaltene concentrate issuing from the underflow opening is collected separately, and, if desired, at least partly freed from the precipitant, e.g. through evaporation. The precipitant recovered may be recycled to the process.

The precipitation is as a rule carried out at slightly elevated temperature, since this slightly further reduces the viscosity of the mixture and is more conducive to the agglomeration of precipitated particles. The highest temperature applicable is determined by the softening point of the asphaltenes in this medium. As a rule temperatures between 30 and 80° C. are applied.

Preferably, a hydrocyclone, or a plurality of hydrocyclones, is used of such dimensions as to ensure that, at an inlet pressure not exceeding about 10 atm. gauge, good and sharp separation of the asphaltenes is still procured. Suitable hydrocyclones are those whose largest inside diameter is 0.5 to 10 cm. The inlet pressure of the asphaltane suspension is then as a rule between 2 and 10 atm. gauge. Conditions are preferably so adjusted that the asphaltene content of the discharged oil after removal of the precipitant is less than 1% w. and preferably less than 0.5% w. To this end hydrocyclones are used in which the relative diameters of the inlet opening, overflow opening and underflow opening are respectively 1.5:3:1 to 2.5:3:2, and 75–95% of the oil mixture fed in is discharged from the hydrocyclones via the overflow opening. Good results are obtained with hydrocyclones of which the diameter of the cylindrical part is 10 mm. and the diameters of inlet opening, overflow opening and underflow opening are 2 mm., 3 mm. and 1.5 mm., respectively. At an intake pressure of 5 atm. gauge, the throughput of this hydrocyclone is 150 liters of asphaltene suspension per hour. Good results were also obtained with a hydrocyclone of which the diameter of the cylindrical part was 25 mm. and the diameters of the inlet opening, overflow opening and underflow opening were 5 mm., 7.5 mm. and 3.75 mm., respectively, the throughput being 1 m.³ per hour at an intake pressure of 2.5 atm. gauge, and with a hydrocyclone of which the diameter of the cylindrical part was 100 mm. and the diameters of the inlet, overflow and underflow openings were 20 mm., 30 mm. and 15 mm., respectively, the throughput being 30 m.³ per hour at an intake pressure of 10 atm. gauge.

To enlarge the throughput capacity several hydrocyclones may be connected in parallel, which can be very suitably done by using multicyclones, that is, constructional units containing a large number of hydrocyclones and which, as a rule, are provided with one intake line and two discharge lines. As used herein, the term "hydrocyclone" is intended to encampass the various multiple hydrocyclone arrangements including simple parallel and series arrangements, as well as multicyclones.

If desired, the sharpness of separation can be enhanced by using hydrocyclones connected in series.

When applying hydrocyclones connected in series, it is desirable, in order to obtain an asphaltene suspension with a low oil content, to dilute the asphaltene suspension issuing from the underflow opening, or openings, of the first hydrocyclone, or multicyclone, with precipitant before it is passed into the second hydrocyclone or multicyclone. Sufficient precipitant is then added to make the oil content of the liquid phase of the asphaltene suspension 2.5% or less.

The asphaltene suspension issuing from the hydrocyclone may be mixed with the deasphaltenized oil as such, or after complete or partial removal of the precipitant. If the process is operated continuously it is as a rule advisable to mix the precipitant-containing asphaltene suspension as such with the deasphaltenized oil, which, too, may still contain precipitant. For in this way a homogeneous distribution of the asphaltene particles in the oil phase is realized in a simple and rapid way. Removal of the precipitant may be effected by passing the mixture into a distillation device. The asphaltene particles then dissolve rapidly in the oil phase while the synthetic bitumen with the desired penetration index is formed. By removing, at the same time, oil components from this product by distillation asphaltic bitumens with a given softening point can be prepared.

A preferred process for the continuous preparation of synthetic bitumens according to the invention is carried out as follows. A straight-run asphaltic residue is divided into two streams (A and B). One stream (A) is cracked by passing it continuously into an installation where thermal cracking conditions prevail and where temperatures between 450 and 500° C. are preferably maintained. The cracked products formed are fed into a distillation device where volatile components and, if desired, part of the oil constituents are removed over the top, while the cracked residue issuing at the bottom, after having been cooled, is mixed continuously and for some time, preferably for 1–6 minutes, with oil-containing precipitant from the process. The oil-containing asphaltene suspension thus obtained is passed into a (first) hydrocyclone or multicyclone from which, via the overflow opening, a product (I) is obtained which consists of a solution of completely or partly deasphaltenized cracked oil in precipitant. Via the underflow opening of this cyclone a suspension of cracked asphaltenes is discharged which is mixed with pure or practically pure precipitant, in such a way that the oil content in the liquid phase of the suspension is 2.5% v. or less. This dilute suspension is subsequently passed into a (second) cyclone from which via the underflow a concentrate of cracked asphaltenes (product II) is discharged and via the overflow an oil-containing precipitant which is passed to the first cyclone.

The second stream of residual oil (B) is, in the same way as the cracked residue obtained from stream A, in a system of two hydrocyclones connected in series, separated into a product III consisting of a solution of completely or partly deasphaltenized oil in precipitant and a product IV consisting of an asphaltene concentrate.

The solution of the dasphaltenized cracked oil (product I) and the non-cracked asphaltene concentrate (product IV) are mixed completely or partly and the mixture thus obtained is fed into a distillation apparatus where precipitant and, if necessary, part of the oil constituents are removed over the top and where a synthetic bitumen with reduced penetration index is discharged at the bottom.

The concentrate of cracked asphaltenes (product II) and the solution of non-cracked deasphaltenized oil (product III) are mixed completely or partly and this mixture is fed, in the same way as the mixture of products I and IV, into a distillation apparatus, where at the bottom a synthetic bitumen with raised penetration index is discharged.

Figure 2:
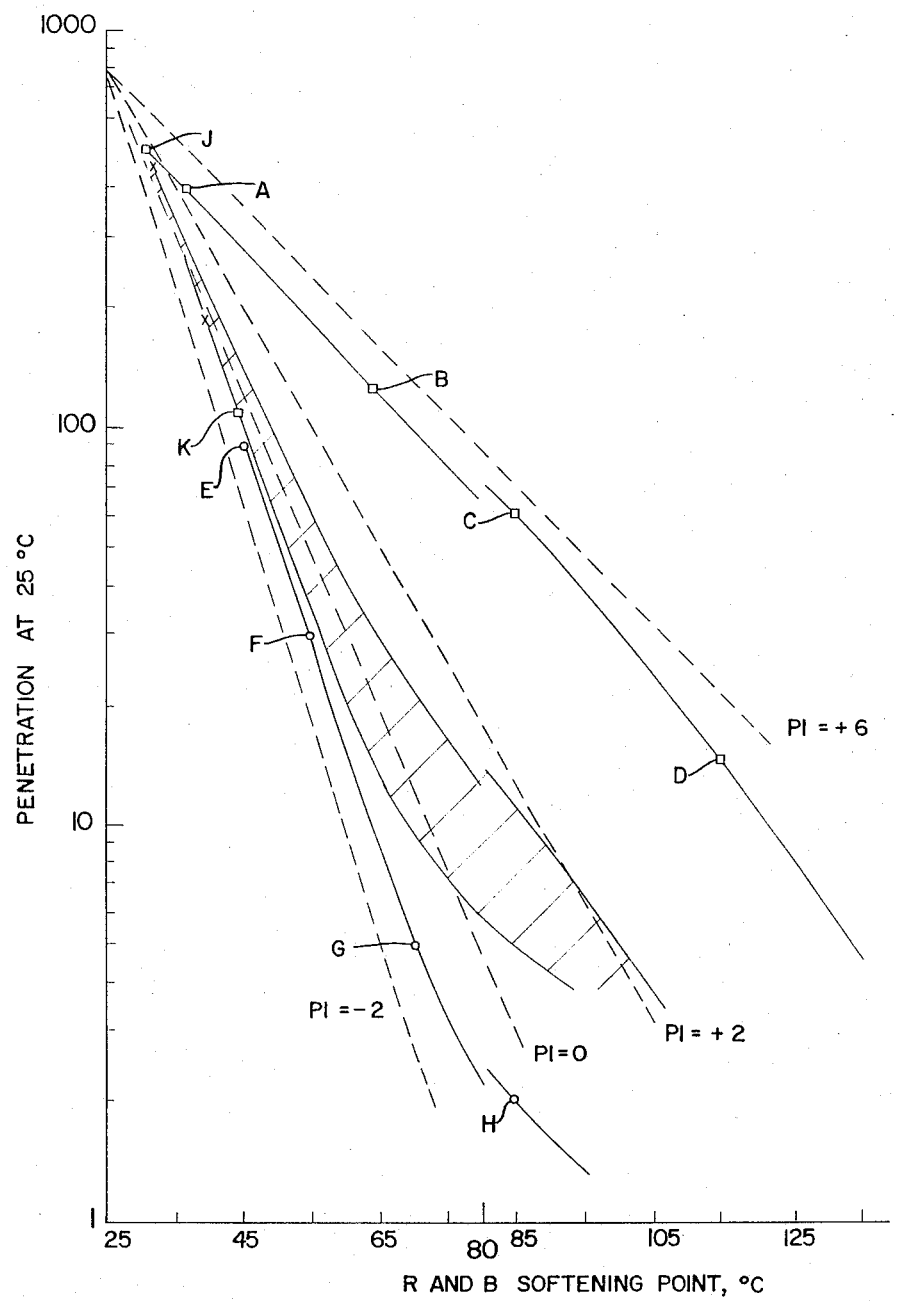

The invention will be better understood by reference to the drawing which consists of two figures of which FIGURE 1, which is a schematic representation of a preferred method of carrying out the process and FIGURE 2, which, by means of a graphical plot of penetration with ring and ball softening point, illustrates the wide range of synthetic bitumen properties obtainable with the process of the invention, and the discussion which follows.

EXAMPLE I

Referring now to FIGURE 1, a residual asphaltic fraction produced by straight-run distillation of a Middle-East crude, which fraction had an initial boiling point of 350° C. (ASTM), a viscosity of 40.6 cs. at 100° C. and an asphaltene content of 2.4% w., was, after having been heated to 100° C., continuously fed at a rate of 1190 kg./hour via line 1 into a plant as represented schematically in FIGURE 1. The stream of residual oil was separated into two parts, namely, 390 kg./hour via line 2 and 800 kg./hour via line 3.

The stream fed in via line 2 was cracked in tubular reactor 4 at a temperature of 490–500° C. The resulting cracked product was passed via line 5 into distillation column 6, where gas, gasoline and a kerosene/gas oil fraction were removed from the system over the top and via lines 7, 8 and 9, respectively. The cracked residue discharged at the bottom of this column (118 kg./hour) was withdrawn via line 10 to be mixed continuously with 596 kg./hour pentane which was supplied from a storage vessel, 11, via line 12. In order to effect rapid and complete precipitation of the asphaltenes, the mixture of cracked residue and pentane, whose temperature was 60° C., was passed through line 13 under conditions of turbulent flow in order to be separated in hydrocyclone 14. Line 13 had a length of 25 m.; the time of residence of the mixture in this line was 1 minute. The dimensions of the cyclone were: diameter of the cylindrical part 25 mm., diameter of inlet opening 7 mm., diameter of overflow opening 8.5 mm. and diameter of underflow opening 4 mm. From the overflow opening of cyclone 14, 473 kg./hour of a pentane-containing oil was withdrawn which was passed into distillation column 18 via line 15, furnace 16 and line 17. At the top of this column 414 kg./hour pentane was removed to be recycled to storage vessel 11 via lines 19 and 20. At the bottom of column 18 deasphaltenized oil was discharged via line 21 at a rate of 59 kg./hour. From the underflow of cyclone 14, via line 22, the pentane-containing asphaltene concentrate issued at a rate of 241 kg./hour.

To the feed stream of 800 kg./hour, fed in via line 3, 3996 kg. pentane was added via line 23, after which this mixture, at a temperature of 60° C. under conditions of turbulent flow with a residence time of one minute, was passed via line 24 into hydrocyclone 25; the diameter of the cylindrical part of this cyclone was 65 mm.

From the overflow of this cyclone, via line line 26, a pentane-containing oil solution was discharged at a rate of 4376 kg./hour, which was passed into distillation column 29 via furnace 27 and line 28. At the top of this column 3633 kg. pentane was removed, which was recycled to storage vessel 11 via lines 30 and 20. At the bottom of column 29, via line 31, deasphaltenized oil was withdrawn at a rate of 743 kg./hour. From the underflow of cyclone 25 via line 32 the pentane-containing asphaltene concentrate issued at a rate of 418 kg./hour.

The deasphaltenized oil recovered, via line 21, from the distillation column was mixed in mixer 33 with the pentane-containing asphaltene concentrate discharged from cyclone 25 via line 32, after which the oil was passed, via line 34, into distillation column 35, where pentane was removed over the top and recycled to the storage vessel via lines 36 and 20. At the bottom of distillation column 35, via line 37, 114 kg./hour synthetic bitumen issued with a ring and ball softening point of 86° C., a penetration of 2 at 25° C. and a penetration index of −0.4.

The deasphaltenized oil recovered via line 31 from distillation column 29 at a rate of 743 kg./hour was divided into a stream of fuel of low ash content (562 kg./hour) which was removed via line 38, and a stream of 181 kg./hour, which was passed via line 39 into mixer 40 to be mixed with the pentane-containing asphaltene concentrate issuing via line 22 from cyclone 14. The mixture was passed via line 41 into distillation column 42 where pentane was removed over the top and recycled to storage vessel 11 via lines 43 and 36. At the bottom of distillation column 42, via line 44, 240 kg. synthetic bitumen with a ring and ball softening point of 87° C., a penetration at 25° C. of 41 and a penetration index of +4.8 was withdrawn.

Summarizing, it is found that, starting from 1190 kg./hour asphaltic residue, according to the process in the embodiment described hereinbefore, the following products are obtained:

114 kg./hour synthetic bitumen with a penetration index of −0.4, very suitable for agglomeration purposes, for instance, for ore and coal (briquetting bitumen); in addition, this bitumen may serve for impregnation purposes and as a binder in the manufacture of electrodes;

240 kg./hour synthetic bitumen with a penetration index of +4.8; this bitumen may be applied, for instance, as revetment and bottom lining of canals and the like, in paper manufacture, for cables and for roofing material;

560 kg./hour asphaltene-free residual fuel of low ash content, and 272 kg./hour valuable light cracked products.

It is observed that the pentane used in the plant is recycled and that via line 45 only the small quantity of unavoidable losses need be supplied.

EXAMPLE II

The starting material was a 500 pen. (25° C.) asphaltic residue obtained by a straight-run distillation of a Middle-East crude.

Part of this asphaltic residue was deasphaltenized in the way as described in Example I, with the aid of two hydrocyclones connected in series, heptane being used as precipitant. The quantity of deasphaltenized oil was 94.5% w. calculated on residue and that of the asphaltenes 5.5% wt.

Another part of the asphaltic residue was thermally cracked at a temperature of 495° C. After the constituents boiling below 350° C. (30% w. on total cracked product) had been distilled off the cracked residue was separated, likewise with pentane in two hydrocyclones connected in series, into a deasphaltenized cracked oil (50% w. calculated on total cracked product) and cracked asphaltenes (20% w. calculated on total cracked product).

In Table I values have been listed of the ring and ball softening point and of the penetration at 25° C. of four compositions (A, B, C and D) composed of different quantities of:

(a) The deasphaltenized oil from the straight-run residue, and (b) The cracked asphaltenes.

In Table II values have been listed of the ring and ball softening point and of the penetration at 25° C. for four compositions (E, F, G and H) composed of different quantities of:

(a) The deasphaltenized cracked oil, and (b) The asphaltenes from the straight-run residue.

In FIGURE II the data of both tables are represented, while in addition lines have been drawn for compositions with a penetration index of −2, 0, +2 and +6, respectively. Compositions A, B, C and D have, with reference to their penetrations at 25° C. and ring and ball softening points in degrees centigrade, marked in the figure with corresponding letters. In the same way this has been done for compositions E, F, G and H. From the location of the curve obtained by connecting points A, B, C and D it appears that it will more or less coincide with the line for penetration index +5, while the curve formed by connecting points E, F, G and H will more or less coincide with the line for a penetration index of about −1. The line J–K represents the "distillation line" of the asphaltic residue used as starting material. The shaded area in FIGURE II shows what bitumen grades can be obtained from this asphaltic starting material upon application of the process described in U.S. patent application Serial No. 332,627 where synthetic bitumens are prepared by adding asphaltenes to an asphaltic residue and subsequently distilling off oil constituents.

TABLE I

[Compositions of: (a) heptane-deasphaltenized residue, and (b) heptane cracked asphaltenes]

|  | A | B | C | D |
|---|---|---|---|---|
| Heptane cracked asphaltenes, percent w | 5 | 30 | 42 | 75 |
| Deasphaltenized residual oil, percent w | 95 | 70 | 58 | 25 |
| Ring and Ball softening point, °C | 37 | 64 | 84.5 | 115 |
| Penetration at 25° C., 0.1 mm | 392 | 125 | 62 | 14.5 |
| Penetration index | +3.1 | +4.8 | +5.5 | +5.3 |

TABLE II

[Compositions of: (a) heptane-deasphaltenized cracked residue, and (b) heptane asphaltenes]

|  | E | F | G | H |
|---|---|---|---|---|
| Heptane asphaltenes, percent w | 30 | 40 | 55 | 65 |
| Deasphaltenized residual cracked oil, percent w | 70 | 60 | 45 | 35 |
| Ring and Ball softening point, °C | 45 | 54.5 | 70 | 85 |
| Penetration at 25° C., 0.1 mm | 90 | 30 | 5 | 2 |
| Penetration index | −1.1 | −1.2 | −1.3 | −0.5 |

In summation, it should be pointed out that the process of the invention is based upon the quite surprising discovery that a full range of asphalts as to colloidal state can be produced by the blending of (1) cracked asphaltenes into straight-run residual oil and (2) straight-run asphaltenes into cracked residual oils. Because this is a process for the purpose of obtaining operating flexibility, it will be evident that the following variables are definable only by the product properties which are sought.

(a) The relative amount of residue starting material which is thermally cracked to obtain cracked residual oil and cracked asphaltenes;
(b) The relative amount of residue starting material which is thermally cracked to obtain cracked residual non-cracked residual oil and uncracked asphaltenes; and
(c) The relative amount of low-ash uncracked deasphaltenized oil which is blended into cracked asphaltenes.

Though, in each of these three instances the disposition to both alternatives is substantial, e.g. at least about 5%, but usually much greater, it is also apparent that the volumetric limits of each of the alternative dispositions is subjective to the desired properties of the two synthetic bitumen product streams. In view of the clear teaching herein, it is, however, submitted to be well within the ordinary skill of the art to make these adjustments and to practice the invention and that such relative proportions are not essential limitations on the scope of the invention.

I claim as my invention:

1. A process for the preparation of synthetic bitumens comprising the steps:
  (a) Deasphaltenizing a cracked asphaltic residual oil to recover (1) a deasphaltenized cracked residual oil fraction and (2) a concentrated cracked asphaltenes fraction;
  (b) Deasphaltenizing a straight run asphaltic residual oil to recover (3) a deasphaltenized straight-run residual oil fraction and (4) a concentrated straight-run asphaltenes fraction;
  (c) Blending the deasphaltenized cracked residual oil fraction (1) with the concentrated straight-run asphaltenes fraction (4) to form a synthetic bitumen of reduced penetration index; and
  (d) Blending the deasphaltenized straight-run residual oil fraction (3) with the concentrated cracked asphaltenes fraction (2) to form a synthetic bitumen of raised penetration index.

2. A process for the preparation of synthetic bitumens from straight-run asphaltic residue comprising the steps:
  (a) Dividing the straight-run asphaltic residue into two streams;
  (b) Subjecting one of the two streams to a thermal cracking treatment at a temperature of 450–500° C. and with a residence time sufficiently short to avoid the formation of substantial quantities of benzene-insoluble products;
  (c) Fractionating the thermally cracked stream to recover an asphaltenes-containing cracked residual oil;
  (d) Treating the asphaltenes-containing thermally cracked residual oil with an asphaltenes precipitant to recover (1) a deasphaltenized cracked residual oil fraction and (2) a concentrated cracked asphaltenes fraction;
  (e) Treating the uncracked second stream of straight-run asphaltic residue with an asphaltenes precipitant to recover (3) a deasphaltenized straight-run residual oil fraction and (4) a concentrated straight-run asphaltenes fraction;
  (f) Blending the deasphaltenized cracked residual oil fraction (1) with the concentrated straight-run asphaltenes fraction (4) to form a synthetic bitumen of reduced penetration index; and
  (g) Blending the deasphaltenized straight-run residual oil fraction (3) with the concentrated cracked asphaltenes fraction (2) to form a synthetic bitumen of raised penetration index.

3. The process of claim 1 in which the deasphaltenizing steps are carried out by means of a $C_{4-9}$ hydrocarbon precipitant having a surface tension, with respect to air, of less than 24 dynes/cm. at 25° C.

4. The process of claim 1 in which the recovery of deasphaltenized oil and concentrated asphaltenes is carried out by means of hydrocyclones.

5. The process of claim 4 in which the largest inner diameter of the hydrocyclones is 0.5–10 cm. and the relative diameters of the inlet opening, overflow opening and underflow opening are respectively from 1.5:3:1 to 2.5:3:2.

6. The process of claim 3 in which the precipitant is pentane.

7. The process of claim 1 in which the deasphaltenizing steps are carried out by
  (a) Mixing the asphaltic residue with a viscosity-reducing amount of precipitant;
  (b) Passing the mixture of asphaltic residue and precipitant to a mixer wherein asphaltene precipitation deasphaltenizing of the residual oil is effected by addition of further amounts of precipitant, the precipitation being carried out at a temperature of 30–80° C. with a residence time of 0.3–10 minutes;
  (c) Passing the mixture of precipitated asphaltenes and deasphaltenized oil to a hydrocyclone and recovering deasphaltenized residual oil from the overflow opening and agglomerated asphaltene particles from the underflow opening of the hydrocyclone.

8. A process for the continuous preparation of synthetic bitumens comprising the steps:
  (a) Dividing a straight-run asphaltic residue into two streams;
  (b) Subjecting one of the two streams to a thermal cracking treatment at a temperature of 450–500° C.

and with a residence time sufficiently short to avoid the formation of substantial quantities of benzene-insoluble products;

(c) Fractionating the thermally cracked stream to recover an asphaltenes-containing cracked residual oil;

(d) Cooling the asphaltenes-containing cracked residual oil and mixing therewith $C_{4-9}$ hydrocarbon precipitant for a period of 1–6 minutes to effect precipitation of asphaltenes and deasphaltenizing of the cracked residual oil;

(e) Passing the mixture of precipitated asphaltenes and deasphaltenized cracked residual oil to a first hydrocyclone and recovering from the overflow outlet a solution of deasphaltenized cracked residual oil in precipitant and recovering from the underflow a suspension of cracked asphaltenes in precipitant, the amount of precipitant in the suspension being no greater than 2.5% by volume;

(f) Passing the suspension of cracked asphaltenes in precipitant to a second hydrocyclone from the underflow outlet of which is recovered a concentrate of cracked asphaltenes and from the overflow outlet of which is discharged a solution of deasphaltenized cracked residual oil, which is then passed to the inlet of the first hydrocyclone;

(g) Mixing the uncracked second stream of straight-run asphaltic residue with a $C_{4-9}$ hydrocarbon precipitant for a period of 1–6 minutes to effect precipitation of asphaltenes and deasphaltenizing of the straight-run asphaltic residue;

(h) Passing the mixture of precipitated asphaltenes and deasphaltenized straight-run residual oil to a first hydrocyclone and recovering from the overflow outlet a solution of deasphaltenized straight-run residual oil in precipitant and recovering from the underflow outlet a suspension of straight-run asphaltenes in precipitant, the amount of precipitant in the suspension being no greater than 2.5% by volume;

(i) Passing the suspension of straight-run asphaltenes in precipitant to a second hydrocyclone from the underflow outlet of which is recovered a concentrate of straight-run asphaltenes and from the overflow outlet of which is discharged a solution of deasphaltenized straight-run residual oil, which is then passed to the inlet of the first hydrocyclone;

(j) Mixing deasphaltenized cracked residual oil with the concentrate of straight-run asphaltenes to form a synthetic bitumen of reduced penetration index; and (k) Mixing deasphaltenized straight-run residual oil with the concentrate of cracked asphaltenes to form a synthetic bitumen of raised penetration index.

References Cited by the Examiner
UNITED STATES PATENTS

| | | | |
|---|---|---|---|
| 3,053,750 | 9/1962 | Beuther et al. | 208—45 |
| 3,087,887 | 4/1963 | Corbett et al. | 208—45 |
| 3,159,571 | 12/1964 | Reman et al. | 208—39 |

DANIEL E. WYMAN, *Primary Examiner.*

P. E. KONOPKA, *Assistant Examiner.*